Figure 1:
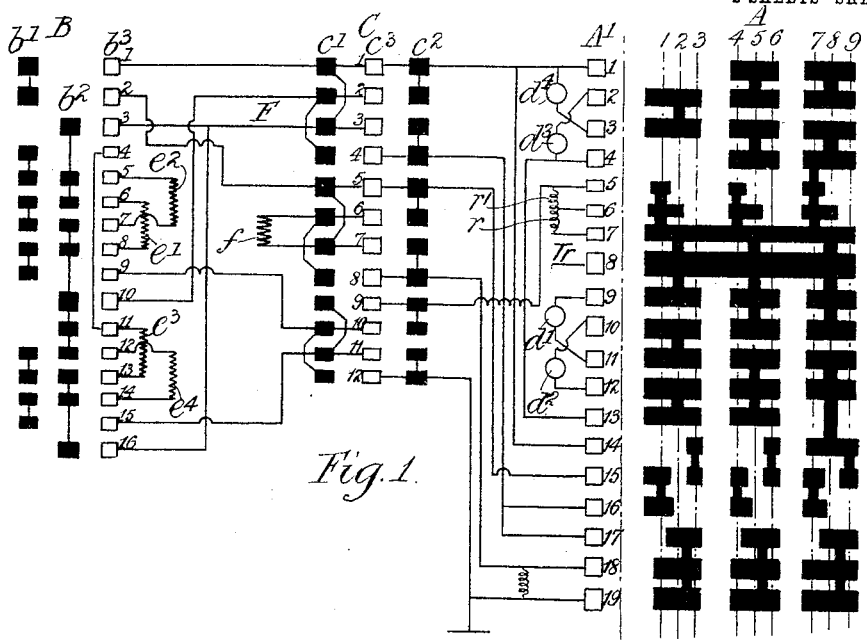

No. 767,154. PATENTED AUG. 9, 1904.
J. G. V. LANG.
MEANS FOR REGULATING ELECTRIC MOTORS.
APPLICATION FILED JAN. 20, 1903.
NO MODEL. 2 SHEETS—SHEET 1.

Witnesses:
M. F. Keating
A. J. Cooney

Inventor
Johan G. V. Lang
By his Attorney
Charles J. Kintner

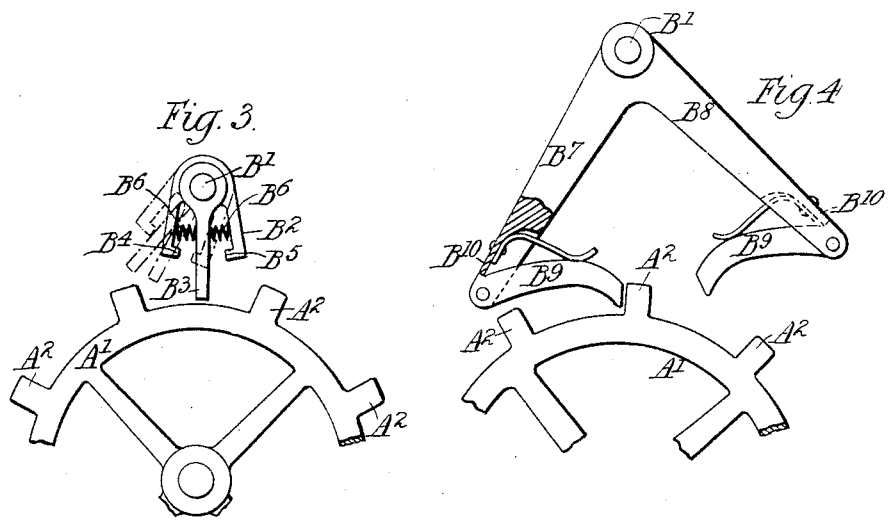
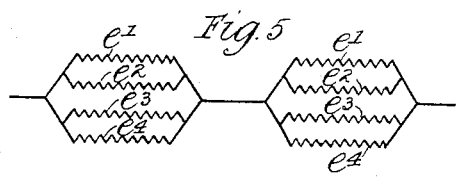
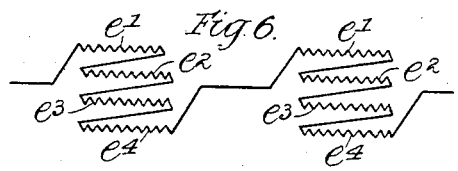
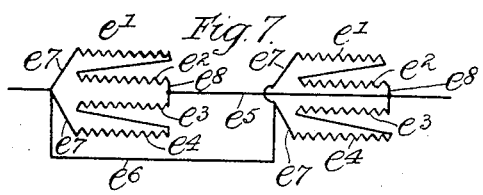
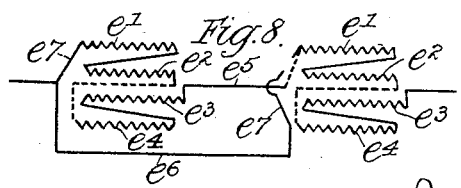

No. 767,154.

Patented August 9, 1904.

UNITED STATES PATENT OFFICE.

JOHAN GUSTAF VIKTOR LANG, OF LONDON, ENGLAND, ASSIGNOR OF ONE-HALF TO EDWARD HIBBERD JOHNSON, OF LONDON, ENGLAND.

MEANS FOR REGULATING ELECTRIC MOTORS.

SPECIFICATION forming part of Letters Patent No. 767,154, dated August 9, 1904.

Application filed January 20, 1903. Serial No. 139,817. (No model.)

*To all whom it may concern:*

Be it known that I, JOHAN GUSTAF VIKTOR LANG, electrician, a subject of the King of Sweden and Norway, residing at 16ª Soho Square, London, England, have invented certain new and useful Improvements in Means for Regulating Electric Motors, of which the following is a specification.

This invention relates to improved means for regulating electric motors, more particularly those of the kind commonly known as "regenerative" motors—*i. e.*, machines that can be utilized for braking purposes and then serve for regenerating or returning to the power-circuit in the form of electricity the energy (kinetic and potential) of the hoist-car or other vehicle to which the motors are applied. Regeneration by motors has been accomplished in various ways, such as by providing said motors with simple shunt field-windings or an independent field excitation, by the reversal of the series field, or by a compounding of the shunt and series field-windings. The last-mentioned method has been found most appropriate for regenerating purposes; but to secure the best results with it a very strong shunt-field is required, which entails a sacrifice of some of the good properties of the series motor as regards acceleration and high efficiency at light loads.

It is the chief object of my invention to enable the good features of the series motor to be retained for the duty of accelerating and running and to still have the shunt characteristics that are essential for regenerative braking. To accomplish this object, I provide the motor with a powerful series field-winding strong enough to enable the motor to be efficiently used as an ordinary series motor, and I also provide said motor with a full shunt-winding to permit of the maximum efficiency being attained when the motor is acting as a regenerator.

In cases where the motor-space is limited, which is especially so in tram-cars, it would be undesirable to have to accommodate a motor having both a full shunt and a full series winding; nor would it be an economical use of valuable space to carry thereon a shunt-coil solely for the purpose of regenerative braking. Therefore I so arrange the windings of the motor that the copper of the shunt-coil can be used in both the shunt and the series windings, and I provide the controller with a suitable device which when said controller is turned in a forward direction (as when starting and propelling the car) causes the shunt-coil to be disconnected and its component spools to be reconnected up in parallel with each other, so as to constitute the series winding. When said controller is turned in a backward direction, as when stopping or when braking in coasting down a hill, for example, the said device causes the shunt-coil to be restored to its shunt condition. Hence it will be seen that the machine thus automatically becomes a simple series-wound motor when acting to propel the vehicle and a shunt or compound wound machine when acting to retard the vehicle and regenerate current.

By the aforesaid method of control I am able to effect a reduction in the starting resistance to obtain higher accelerating efficiency and to obtain higher running efficiency at intermediate speeds with light loads.

Another part of my invention has reference to the manipulation of the series field turns to effect the required speed changes for the purpose. I employ, in addition to the series turns derived from the paralleling of the shunt-coils, as aforesaid, other series turns, and I so arrange them as to obtain the variation of turns and different resistances. With spools in various series-parallel combinations I am able to produce the field changes necessary to effect the desired changes of speed.

Another part of my invention has reference to the manner in which I overcome the complication presented by the multiplicity of connections entailed in the change of the shunt-windings from their series relation to the parallel relation with each other, which is required by their use as series windings. For this purpose I interconnect the shunt field-coils in such manner as to enable them to be grouped in pairs of series-parallel coils to form the series field or to be grouped in series with each other when forming the shunt-field by changing the ends of each series-parallel group only instead of changing the ends of each individual coil.

In order that my said invention may be clearly understood and readily carried into practice, I will describe the same more fully with reference to the accompanying drawings, in which—

Figure 2:
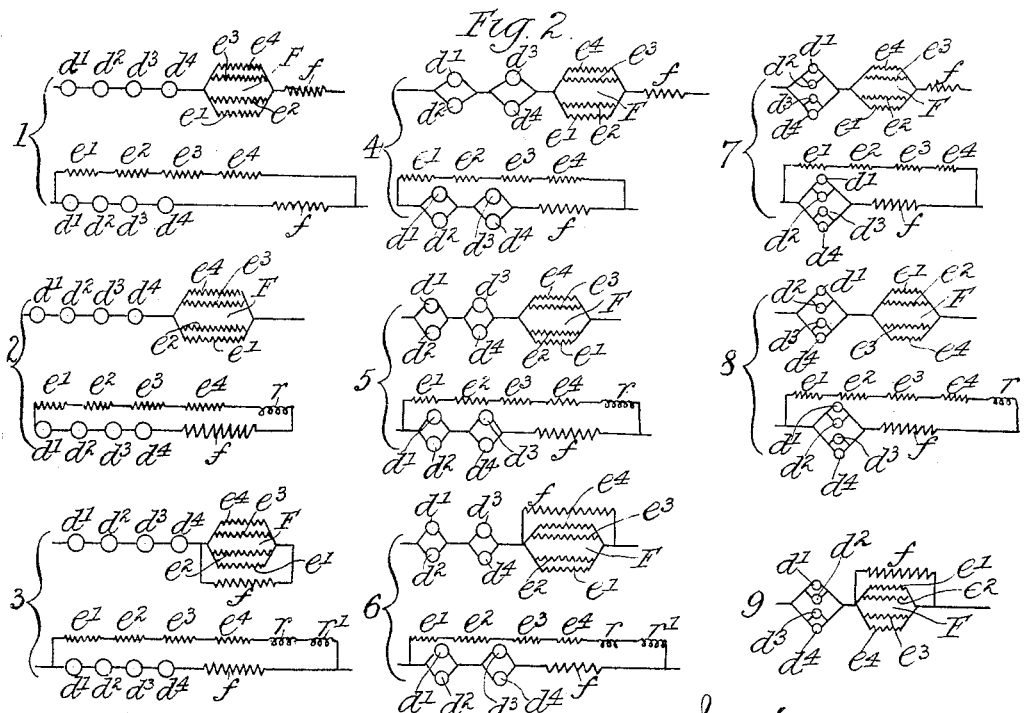

Figure 1 is a diagrammatic view showing a development of the main controller-cylinder, the field-changing cylinder, and the reversing-cylinder, together with the various connections. Fig. 2 is a collection of notch diagrams, showing the various combinations of the motor-circuits when the controller-cylinder is turned from notch to notch in a forward or backward direction. Fig. 3 illustrates the device which operates in connection with the main controller-cylinder for bringing about the changes in the shunt-coils by means of the field-changing cylinder. Fig. 4 illustrates a modification of the said device. Figs. 5 to 8 are diagrammatic views showing the manner in which I overcome the complication of connections which would arise in changing from the series to the parallel relation, and vice versa.

Referring more particularly to Figs. 1 and 2, A represents the main controller-cylinder, and A' the fixed contacts, with which it coöperates, said fixed contacts being numbered 1 to 19. B represents the field-changing cylinder, and C the reversing-cylinder. The two vertical rows of black squares $b'$ $b^2$ of the cylinder B represent the movable contacts which come into play when the controller-cylinder is moved in a backward or forward direction, respectively. $b^3$ represents the fixed contacts with which these movable contacts coöperate, said fixed contacts being numbered from 1 to 16. The two vertical rows of black squares $c'$ $c^2$ of the cylinder C represent the contacts for effecting the movement of the car in a backward or forward direction, respectively, and $c^3$ represents the fixed contacts with which they coöperate, said fixed contacts being numbered from 1 to 12. There are nine notches of the controller (represented by the numerals 1 to 9) arranged in three groups, one comprising 1 to 3, another 4 to 6, and the third 7 to 9. In the example illustrated there are supposed to be four motors, of which the circles $d'$ $d^2$ $d^3$ $d^4$ represent the armatures, $e'$, $e^2$, $e^3$, and $e^4$ represent the shunt-windings, and $f$ represents the series windings. F represents the general grouping of the shunt-coils in parallel with each other, so that they can act collectively as series windings. $r$ and $r'$ represent resistances hereinafter referred to, and $Tr$ represents the trolley connection.

In Fig. 2 the numerals 1 to 9 represent the nine conditions of the windings corresponding with the nine positions of the controller-cylinder, and in this figure the grouping of the windings shown in the upper half of each diagram represents that due to the forward direction of the controller, while the lower half represents that due to the backward direction of said controller. In this way the upper halves of all the figures show the successive steps in the groupings during the turning of the handle from the first to the last notch, while the lower halves represent the successive stages while turning the handle the opposite way, the change or switching over from one series of steps to the other being effected, as hereinafter described, by means of the field-changing cylinder B, which is actuated automatically whenever the direction of motion of the main controller-handle is changed. In other words, as long as the handle is moving forward the plates $b^2$ are in contact with the plates $b^3$ and, in conjunction with the main-cylinder contacts, bring about the groupings shown at the upper part of each of the notch diagrams constituting Fig. 2. The moment, however, the handle is turned backward the field-changing cylinder is operated and its plates $b'$ take the place of the plates $b^2$, thereby transposing the groupings, so that those shown in the lower parts of the notch diagrams take place.

From an inspection of Fig. 2 it will be seen that in starting the armatures are all in series, while the shunt-windings $e'$ to $e^4$ are coupled in parallel with each other in a single group F, which as a whole is in series with the main series winding $f$. At the next notch the series winding $f$ is cut out, while at notch 3 it is thrown into parallel with the grouped coils F. At notch 4 the armature grouping has been changed to a two-in series and two-in parallel arrangement and the field-coils have been changed back into the condition shown at notch 1. The armatures remaining the same, the field-coils then at notches 5 and 6 repeat the transitions indicated in notches 2 and 3. Finally, when the speed of the car has increased considerably notch 7 is reached, where the armatures are all in parallel with each other, and from notch 7 to notch 9 the same gradual change in the field grouping is effected as in notches 1 to 3 and 4 to 6. Assuming, then, that notch 9 is reached, the car then comes to a long run downhill, where the motor can be used as a dynamo to regenerate current. The controller-handle is naturally turned backward, and its first action (by means of a device such as shown in Figs. 3 and 4) is to actuate the field-changing cylinder B, so that at notch 8 the shunt-windings $e'$ to $e^4$ are all in series with each other and with the resistance $r$, but constitute a true shunt-winding across the armature and series field-coil. At notch 7 the resistance $r$ is removed. At notch 6 the armatures are thrown into series parallel, and now the two resistances $r$ $r'$ are brought into the shunt-field. Then resistance $r'$ is cut out (notch 5) and next (notch 4) the resistance $r$ is cut out. Analogous changes occur in going back from notch 3 to notch 1; but if at any time the motorman should again move the handle forward, as he would do when wishing to increase the speed of the car, then the field-changing cylinder B would at once be switched over, so as to bring about the necessary upper series grouping corresponding to the particular notch at which the handle happens to be. The course taken by the electric current when the controller-handle is at the first notch and the car is being accelerated in a forward direction is as follows: from the trolley connection $Tr$ through contacts 8 and 9 of the fixed contacts $A'$ to the armature $d'$, contacts 11 and 10, armature $d^2$, contacts 12 and 13, armature $d^3$, contacts 2 and 3, armature $d^4$, and thence to contacts 1 and 2 of the row of fixed contacts $c^3$ of the reversing-cylinder C. This row of contacts is supposed to be lying contiguous to the row of contacts $c^2$ as the car is traveling in a forward direction. From said contact 2 the current flows to contact 10 of the row of fixed contacts $b^3$ of the field-changing cylinder B. This row of contacts is at this time supposed to be lying contiguous to the row of contacts $b^2$. At said contact 10 the current divides, one portion flowing along the contacts $b^2$ to contacts 8 7, coils $e'$ $e^2$, and contacts 6 5 to contact 3, the other portion of the current flowing in the opposite direction through said contacts $b^2$ and reaching contacts 11 12, coils $e^3$ $e^4$, and contacts 13 and 14 and contact 16. From the said contacts 3 and 16 the current flows and meets again in conductor F, whence it flows to contacts 3 and 4 of the contacts $c^3$ of the reversing-cylinder C. The current flows from this last-mentioned contact 4 to contact 16 of the contacts $A'$ of the main controller-cylinder A. The current flows to contact 5 of the contacts $c^3$ of the reversing-cylinder C and to contact 6 of contacts $c^3$. Thence the current flows to coil $f$ and through it to contact 7. It then passes through contacts $c^2$ to contacts 8 and 18 of the contacts $A'$, whence it passes to contact 19 and to earth. The course taken by the current when the controller-handle is at the first notch, as aforesaid, and the car being retarded is as follows, it being understood that in such case the row of contacts $c^2$ of the reversing-cylinder C will be contiguous to the fixed contacts $c^3$, as before, and that the row of contacts $b'$ of the field-changing cylinder B will be contiguous to the fixed contacts $b^3$: Starting from the trolley connection $Tr$ and contact 8 of the contacts $A'$, the current flows to contact 9, armature $d'$, contacts 11 and 10, armature $d^2$, contacts 12 and 13, armature $d^3$, contact 2 and 3, and armature $d^4$, thence to contact 1 of the contacts $c^3$ to contact 1 of the contacts $b^3$ and over the contacts $b'$ to contact 2 of the contacts $b^3$, thence to contacts 5 and 6 of the contacts $c^3$, through coil $f$ to contact 7, thence through the contacts $c^2$ to contact 8, and thence to contact 18 of the contacts $A'$ and to earth. At the same time current also passes from the trolley-contact 8 of the contacts $A'$ to contact 5 and thence to contacts 9 and 10 of the contacts $c^3$. Thence the current flows to contact 9 of the contacts $b^3$, to contact 8, coil $e'$, contacts 6 and 7, coil $e^2$, contacts 5 and 4, to contact 11, coil $e^3$, contacts 13 and 12, coil $e^4$, contacts 14 and 15, to contact 11 of the contacts $c^3$, and thence to earth.

Referring now to the device for actuating the field-change cylinder on a changing of motion of the controller-handle, the construction shown in Fig. 3 comprises a spindle $B'$ for the field-changing cylinder, which spindle is furnished with a horseshoe-shaped frame $B^2$ keyed thereto. The said spindle is also provided with a separate finger $B^3$, which is normally retained in an intermediate position relatively to the members $B^4$ $B^5$ of said frame by springs $B^6$ $B^6$. $A'$ is a wheel carried by the main controller-cylinder A, so that it follows the movements of the controller-handle. This wheel has radial projections or cogs $A^2$ corresponding with the notches of the controller. When this wheel turns during the movement of the controller-cylinder A— say in a "forward" direction—$i. e.$, toward the left—these cogs or projections $A^2$ act upon the finger $B^3$ and press it against the member $B^4$ thereof, thus shifting the frame $B^2$ and turning the spindle $B'$ and field-changing cylinder. The contacts $b^2$ of said field-changing cylinder are thus brought into connection with the fixed contacts $b^3$. As long as the handle is turned in the same direction the cogs all tend to press the finger $B^3$ to the same side, and hence the field-changing cylinder B remains in the same position. When, however, the controller-handle is moved in the other direction, the first cog strikes the finger $B^3$ and causes it and the frame $B^2$ to swing over to the other side and bring the other set of contacts $b'$ into position. This continues until the direction of the handle changes again, and so on.

Fig. 4 represents a modified form of the frame $B^2$, which in this case comprises two arms $B^7$ $B^8$, mounted on the spindle $B'$ of the field-changing cylinder B. Each arm carries a spring-controlled pawl $B^9$, whose outward movement is limited by a suitable stop $B^{10}$. These pawls are acted upon by the projections $A^2$ of the wheel $A'$ in an analogous manner to that described with reference to Fig. 3. Thus when the wheel $A'$ turns in one direction the cogs cause the frame comprising the arms $B^7$ $B^8$ to swing in the same direction and permit it to remain in this position until a change in the motion of the wheel $A'$ takes place, when in the first part of such motion the cogs act on the opposite pawl to that on which they previously acted, and hence the arms swing the opposite way and operate the field-changing cylinder accordingly.

The improved method of changing the grouping of the field-coils will now be described with reference to Figs. 5 to 8. $e'$ $e^2$ $e^3$ $e^4$ represent, as before, the four shunt-windings of each of two motors, which are connected together in series parallel in Fig. 5. To restore these windings to their series connection in the ordinary way would involve the change of sixteen connections, as shown in Fig. 6. In order to simplify this multiplicity of connections, I arrange the shunt-windings as shown in Fig. 7, so that a connecting-wire $e^5$ leads to the junction of the two middle coils, and another connecting-wire, $e^6$, terminating in a pair of wires $e^7$, leads to the terminal of the two outer coils and is therefore common to both. Thus in changing to the series condition it is only necessary to open the lower branches $e^7$ and the connections $e^8$ and to couple up the left-hand ends of the coils $e^4$ with the right-hand ends of the coils $e^2$, as in Fig. 8. Thus a change of only eight connections in the improved arrangement produces the same effect as that for which a change of sixteen was required before.

No claim is made hereinafter to the method of operation effected by the apparatus hereinbefore described and hereinafter claimed, as this feature constitutes the subject-matter of a separate or divisional application filed in the United States Patent Office on the 19th day of April, 1904, bearing Serial No. 203,838.

What I claim, and desire to secure by Letters Patent of the United States, is—

1. In an electric motor, the combination of means for producing a series excitation only when the machine is acting as a motor, and means for producing a compound excitation when said machine is acting as a generator, substantially as described.

2. In an electric motor, the combination of a series winding which is utilized as such when the machine is running as a motor, a shunt-winding, and means for utilizing said shunt-winding as a series winding when required, substantially as described.

3. In an electric motor adapted to work as a compound generator, the combination with the normal series windings or turns, of other series windings or turns derived from the shunt-coil, and means for enabling the various series windings or turns to be connected in different series-parallel combinations for producing the desired field changes without the aid of shunt field excitation, substantially as described.

4. The combination of a series-wound electric motor, a controller-cylinder, and means for changing said motor to a shunt or compound dynamo when the direction of movement of the controller-cylinder is changed, substantially as described.

5. The combination of a series-wound electric motor, additional windings which are utilized as shunt turns when the machine is running as a dynamo, a controller-cylinder, a field-changing cylinder, and means for operating said field-changing cylinder when the direction of movement of the controller-cylinder is changed, substantially as described.

6. In a motor-control arrangement, the combination of a pair of motors, series field-windings thereon, additional windings which are utilized as shunt turns when the machine is running as a dynamo, double armature-windings, means for altering the grouping of the field-windings, and means for modifying the changes in the field-windings according as the machine is used to exert power or to generate current, substantially as described.

7. In a motor-control arrangement, the combination of a series-wound electric motor, additional windings which are utilized as series turns when the machine is running as a motor and as shunt turns when the machine is running as a dynamo, a main controller-cylinder, a field-changing cylinder, and means actuated by the main controller-cylinder to operate said field-changing cylinder, substantially as described.

8. In a motor-control arrangement, the combination of a series-wound electric motor, additional windings which are utilized as series turns when the machine is running as a motor and as shunt turns when the machine is running as a dynamo, of a main controller-cylinder, a field-changing cylinder, a device on said field-changing cylinder for throwing it to one side or the other and means on said main controller-cylinder for operating said device, substantially as described.

9. In a motor-control arrangement, the combination of a pair of motors, series windings on said motors each consisting of a plurality of coils, a connection extending from the junction of the two middle coils, and a connection common to the ends of the two extreme coils, substantially as and for the purpose set forth.

In testimony whereof I have hereunto set my hand, in presence of two subscribing witnesses, this 5th day of January, 1903.

JOHAN GUSTAF VIKTOR LANG.

Witnesses:
T. SELLY WARDLE,
WALTER J. SKERTEN.